(12) United States Patent
Enqvist et al.

(10) Patent No.: US 12,195,492 B2
(45) Date of Patent: Jan. 14, 2025

(54) METHOD FOR LIGNIN PURIFICATION

(71) Applicant: Ligneasy Oy, Helsinki (FI)

(72) Inventors: Eric Enqvist, Helsinki (FI); Ville Tarvo, Helsinki (FI); Panu Tikka, Helsinki (FI)

(73) Assignee: Ligneasy Oy, Helsinki (FI)

( * ) Notice: Subject to any disclaimer, the term of this patent is extended or adjusted under 35 U.S.C. 154(b) by 740 days.

(21) Appl. No.: 17/429,368

(22) PCT Filed: Feb. 10, 2020

(86) PCT No.: PCT/FI2020/050079
§ 371 (c)(1),
(2) Date: Aug. 9, 2021

(87) PCT Pub. No.: WO2020/161397
PCT Pub. Date: Aug. 13, 2020

(65) Prior Publication Data
US 2022/0127295 A1    Apr. 28, 2022

(30) Foreign Application Priority Data
Feb. 8, 2019   (EP) ...................................... 19397504

(51) Int. Cl.
*C07G 1/00*        (2011.01)
*D21C 11/00*       (2006.01)

(52) U.S. Cl.
CPC ............ *C07G 1/00* (2013.01); *D21C 11/0007* (2013.01)

(58) Field of Classification Search
CPC .............................. C07G 1/00; D21C 11/0007

USPC ........................................................ 530/500
See application file for complete search history.

(56) References Cited

U.S. PATENT DOCUMENTS

| | | | |
|---|---|---|---|
| 2,406,867 | A | 9/1946 | Tomlinson et al. |
| 3,048,576 | A | 8/1962 | Ball et al. |
| 8,172,981 | B2 | 5/2012 | Tomani et al. |

(Continued)

FOREIGN PATENT DOCUMENTS

| | | |
|---|---|---|
| CN | 101476257 B | 1/2011 |
| EP | 108623817 A | 10/2018 |

(Continued)

OTHER PUBLICATIONS

Ziesig et al: Production of a purified pure lignin product. Part 2: separation of lignin from membrane filtration permeates of black liquor. Cellulose Chemistry and Technology, Oct. 1, 2014, vol. 48, No. 9-10, pp. 805-811.

(Continued)

*Primary Examiner* — David T Karst
(74) *Attorney, Agent, or Firm* — Laine IP Oy

(57) ABSTRACT

The invention is directed to a method for producing a purified lignin salt from alkaline spent liquor from the chemical cooking of lignocellulosic raw materials. The method comprises the steps of decreasing the spent liquor pH to form a lignin precipitate suspension; filtering the lignin precipitate to form a lignin filter cake and a filtrate; mixing the lignin filter cake into a dilution liquid to form an alkalilignin agglomerate colloid; subjecting the alkalilignin agglomerate colloid to large-pore membrane filtration; and recovering a purified lignin salt concentrate.

14 Claims, 1 Drawing Sheet

(56) References Cited

U.S. PATENT DOCUMENTS

| | | | |
|---|---|---|---|
| 8,486,224 B2 * | 7/2013 | Ohman | ............ D21C 11/0007 |
| | | | 162/16 |
| 2011/0297340 A1 | 12/2011 | Kouisni | |
| 2017/0101430 A1 * | 4/2017 | Enqvist | .................... C08H 6/00 |

FOREIGN PATENT DOCUMENTS

| | | | |
|---|---|---|---|
| JP | S6290389 A | 4/1987 | |
| RU | 2532107 C2 | 10/2014 | |
| WO | WO2006038863 A1 | 4/2006 | |
| WO | WO2008079072 A1 | 7/2008 | |
| WO | WO2013002687 A1 | 1/2013 | |
| WO | WO2013135485 A1 | 9/2013 | |
| WO | WO2014193289 A1 | 12/2014 | |
| WO | WO2015137861 A1 | 9/2015 | |
| WO | WO-2017174207 A1 * | 10/2017 | ........... C07C 303/06 |

OTHER PUBLICATIONS

Aminzadeh et al: Membrane filtration of kraft lignin: Structural characteristics and antioxidant activity of the low-molecular-weight fraction. Industrial Crops and Products, 2018, vol. 112, pp. 200-209.

Holmqvist el al: Ultrafiltralion of krafl black liquor from Lwo Swedish pulp mills. Chemical Engineering Research and Design, Aug. 1, 2005, vol. 83, No. 8, pp. 994-999.

Liu et al: Treatability of kraft spent liquor by microfiltration and ultrafiltration. Desalination Elsevier, Jan. 15, 2004, vol. 160, No. 2, pp. 131-141.

Luque et al: TAPPI Pulping Conference, 1994, p. 507.

Rojas et al: Lignin separation from kraft black liquors by tangential ultrafiltration. Science and Technology, Jan.-Feb. 2006, No. 1, Anno 88, pp. 88-95.

Wallberg et al: Ultrafiltration of kraft black liquor with a ceramic membrane. Desalination, Aug. 1, 2003, vol. 156, No. 1-3, pp. 145-153.

* cited by examiner

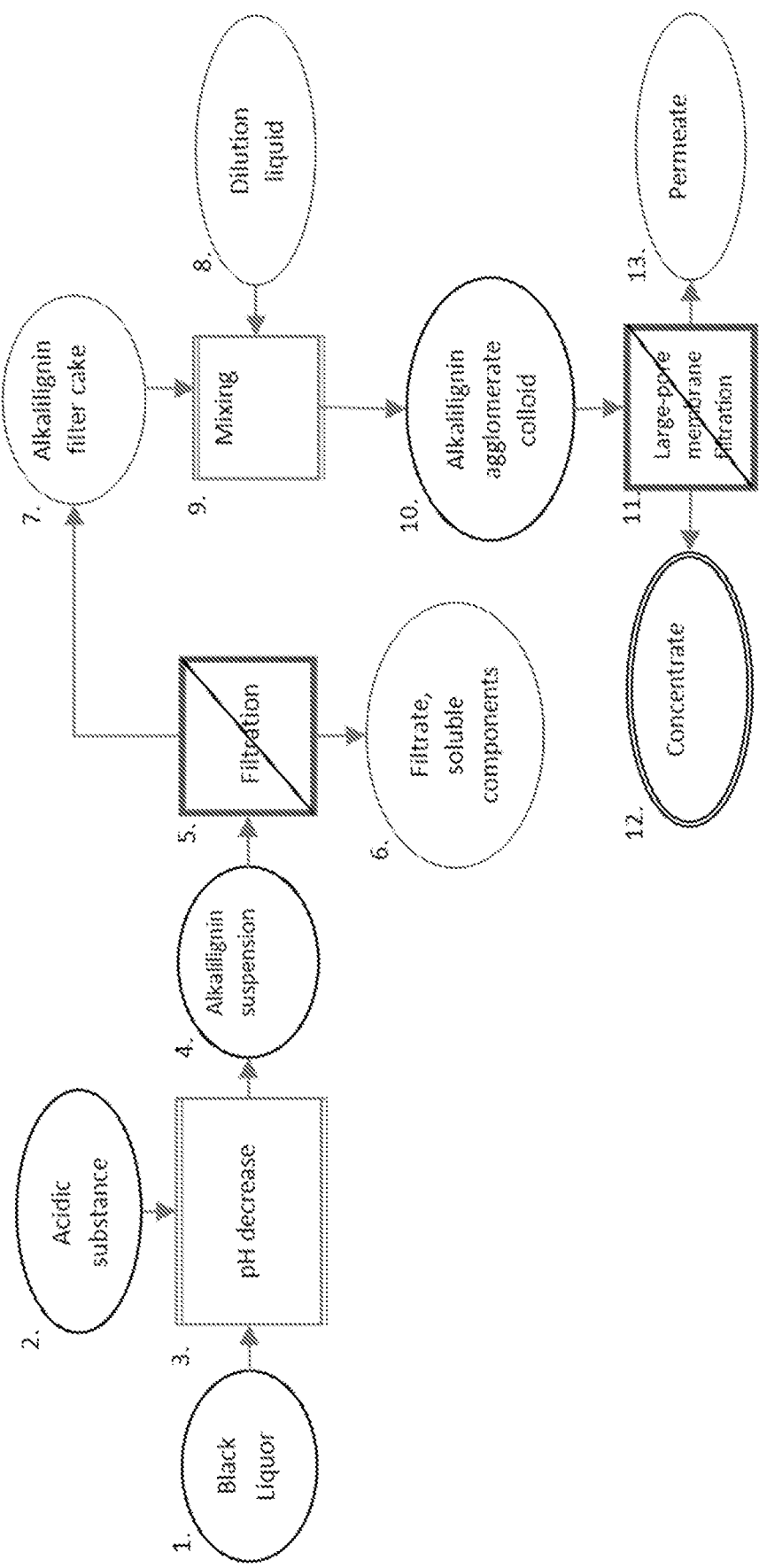

METHOD FOR LIGNIN PURIFICATION

FIELD

The present invention relates to lignin separation and purification. In particular, the present invention concerns a two-stage method of producing purified lignin salt from black liquor.

BACKGROUND

Lignin is a promising raw-material for bio-based products. Significant quantities of lignin are available in the spent liquors from industrial Kraft pulping, i.e. in black liquor. Lignin concentration in black liquor is typically only 20-40%-w on dry basis, with the rest of the dry matter comprising spent pulping chemicals and dissolved non-lignin wood components. High purity is important in lignin products. Hence, cost efficient separation and purification operations are needed to make Kraft lignin utilization feasible in industrial scale.

A well-known method for purification of lignin is ultrafiltration as described i.a. by Luque et al, TAPPI Pulping Conference 1994, 7. Ultrafiltration is a fractionation process to produce from liquor, in high alkalinity (pH>12) where lignin is in dissolved form, a concentrate which is enriched in high molecular mass lignin (e.g. 29% over 15.000 Dalton, Luque et al.) and a permeate which contains more of the low molecular mass lignin and other low molecular mass black liquor components, inorganic salts and organic acids.

Evidently, ultrafiltration increases the share of high molecular mass lignin in the concentrate, but only modestly, from 15 to 29% lignin over 15.000 Dalton (Luque et al). In addition to the rather modest fractionation result, the ultrafiltration technical operation using Kraft black liquor is difficult due to concentration polarization and membrane fouling. A continuous decline of flux rate takes place, and ultrafiltration is not a very good fractioning method to produce a product of specific molar mass, since the fouling of membranes leads to a situation where the molecular mass distribution of the concentrated material changes all the time.

A further example of conventional ultrafiltration is given in Rojas et al., "LIGNIN SEPARATION FROM KRAFT BLACK LIQUORS BY TANGENTIAL ULTRAFILTRATION", Science and Technology, La Chimica e l'Industria-Gennaio-Febbraio '06 n. 1-ANNO 88. (2006). This article provides an example of the problems faced in this approach. It is described how typical Kraft black liquor was ultrafiltrated using typical membranes. The average molecular weight for the examined industrial black liquor ranged from ca. 1700 to 20000 Da. The Mw of the concentrates and filtrates correlated with the membrane molecular weight cut-off (MWCO). However, Rojas et al. found that the effective molecular size of filtered particles was smaller than the membrane nominal molecular weight cut-off. This difference may be due to the typical clogging of membranes that is an inherent problem in this type of application, as well as reduction in filtration flux due to membrane plugging and/or fouling.

Black liquor contains a lot of inorganic salts and organic aliphatic and phenolic compounds which compromise the membrane performance thus making the molecular weight fractioning process very challenging, as described by Aminzadeh et al., MEMBRANE FILTRATION OF KRAFT LIGNIN: STRUCTURAL CHARACTERISTICS AND ANTIOXIDANT ACTIVITY OF THE LOW-MOLECULAR-WEIGHT FRACTION, Industrial Crops & Products 112 (2018) 200-209.

Producing purified lignin from black liquor with ultrafiltration is thus not very useful. It is very likely that the purification performance stays low, and constant material flow is very limited even if the UF membranes are washed periodically (Aminzadeh et al).

Another method to purify Kraft lignin is represented by the commercial and patented Lignoboost process (WO 2006/038863 and WO 2013/002687). Using the Lignoboost process, Kraft lignin is separated in a two-stage process. The first stage comprises lignin precipitation, e.g. by CO2 addition, followed by filtration. In the second stage, the filtered precipitate is re-slurried usually into H2SO4-water solution, followed by an acidic washing in a second filtration. The drawback of the process is the demand for significant expenditure in process equipment and addition of sulphuric acid and thereby introduction of excess sulphur into the closed Kraft pulping recovery cycle, which distorts the pulp mill's Na/S balance.

Definitions

In the present context, the term "large-pore membrane filtration" refers to cross-flow filtration of particles formed of agglomerated lignin macromolecules. The cutoff point is at least 40 000 Dalton. Advantageously, the cutoff point in a large-pore membrane filtration according to the present invention is in the range of 40 000-500 000 Da, preferably 50 000-200 000 Da.

In the present context, a "dilution liquid" is an aqueous liquid having no significant ionic strength or significant amount of dissolved organic material. In addition to plain water, examples of dilution liquids commonly occurring in pulp mills are condensate from an evaporation plant, filtrate from a bleach plant, or mill hot water.

In the present context, a lignin salt is a chemical form of lignin, in which part of the acid groups in lignin are dissociated and the negative charge of the dissociated acid groups is counterbalanced by cations. The lignin salt may involve various cations, but typically there is one principal cation, which is the same as the cation of that alkaline pulping process, where the lignin salt originates from. In case of Kraft lignin salt, the primary cation is sodium ($Na^+$).

In the present context, a lignin precipitate suspension is formed when the original pulp mill black liquor pH is lowered to 9-10.5 using an acidic substance.

In the present context, a lignin filter cake is formed from the lignin precipitate suspension by filtering on a filtering media.

In the present context, a lignin agglomerate is a union aggregate of lignin macromolecules in a colloidal state, whereby the particle size of the aggregate is large enough (>50 kDalton) to be filtered out (to remain on the membrane) in a large-pore membrane filtration. It is important to note that these agglomerate lignin particles are at least ten times the size of the lignin macromolecules in the original black liquor (typically 5 kDalton) which flow through a large-pore membrane.

SUMMARY OF THE INVENTION

The invention is defined by the features of the independent claim. Some specific embodiments are defined in the dependent claims.

It is the aim of the invention to overcome at least some of the drawbacks relating to the known state-of-the-art technical solutions described in the background section.

According to a first aspect of the present invention, there is provided a method for producing a purified lignin salt from alkaline spent liquor from the chemical cooking of lignocellulosic raw materials. The method comprises the steps of:

decreasing the spent liquor pH to form a lignin precipitate suspension filtering the lignin precipitate to form a lignin filter cake and a filtrate mixing the lignin filter cake into a dilution liquid to form an alkalilignin agglomerate colloid subjecting the alkalilignin agglomerate colloid to large-pore membrane filtration recovering a purified lignin salt concentrate.

The purified lignin concentrate constitutes the product. Small-molecular organic and inorganic components are removed in a flown-through liquid.

It is to be noted the new unexpected finding: Mixing the lignin precipitation filter cake into an aqueous solution under certain controlled conditions described below results in large lignin agglomerates which can be separated and enriched using large-pore membrane filtering. Considerable advantages are obtained by this invention which enables a method that:

avoids using the small-pore conventional ultrafiltration membranes and all their associated difficulties separates a relatively pure lignin product by retaining the lignin agglomerates on the large-pore membrane and permitting small molecular organic and inorganic components to flow through and be removed thereby avoids acid wash and use of sulphuric acid that would distort the chemical balance of the pulp mill supplying the spent liquor Advantageously, the decrease in pH in the spent liquor is carried out by the addition of $H_2SO_4$, HCl, $SO_2$ or $CO_2$. Preferably, the decrease in pH is carried out by addition of $CO_2$.

Advantageously, the decrease in pH in the spent liquor is carried out at a temperature in the range 40-85° C.

Advantageously, the pH in the spent liquor is decreased to below 11.

Preferably, the spent liquor pH is decreased to 9–10.5.

Advantageously, the large-pore-membrane filtration is carried out at a temperature in the range 20-85° C.

Advantageously, the large-pore-membrane filtration is carried out at a pH in the range 7-11.

Next, the embodiments will be examined in more detail with reference to the attached drawings.

BRIEF DESCRIPTION OF THE DRAWINGS

FIG. 1 is a general schematic diagram of the lignin purification process according to the invention,

DETAILED DESCRIPTION

As briefly discussed above, presented is a method for producing purified alkalilignin salt. The method is a two-stage process as generally described in FIG. 1.

In the first stage of the present invention, an alkalilignin precipitate suspension is formed from the alkaline pulping spent liquor, i.e. black liquor (1), (dry solids content typically 25-45 weight-%) by decreasing pH to 9-3110.5 (3), at a temperature between 40-85° C. The formed alkalilignin suspension is filtered (5) making a filter lignin cake (7) and a permeate liquid (6) containing black liquor soluble components which are taken back to the pulp mill chemical cycle process.

In the second stage the above mentioned filter lignin cake (7) is mixed with dilution liquid (8) using certain controlled mixing and temperature (9) and forming an alkalilignin agglomerate colloid (10) at typically 10 weight-% dry solids content. This is the new, unexpected finding, the existence of alkalilignin as large colloidal agglomerate particles in diluted aqueous solution, which particles have an average particle-mass over 50 kilodaltons and which enable the technically and industrially useful production of purified alkalilignin salt.

The alkalilignin agglomerate colloid (10) is fed on a large-pore membrane (11) having cut-off pore size of 50-200 kilodalton typically in the temperature range of 20-85° C. The alkalilignin remains in the concentrate (12), whereas most of the smaller particle and small molecular soluble components transfer through the large-pore membrane into the permeate (13). The difference and the technical advantage are significant compared to conventional ultrafiltration of lignin from black liquor using typically 5 kilodalton pore-size special technology membranes.

A significant advantage of the present invention compared to the prior art lignin membrane separation (ultrafiltration) is that alkalilignin can be enriched as large, colloidal particles, here called alkalilignin agglomerates. This is evident as an enriched concentrate can be made on a large-pore membrane characterized by "molecular mass" cut-off of 50-200 kilodalton. Here this is called large-pore membrane filtration. The "large-pore" in practical terms means typically a membrane pore size ten times the pore size used in conventional ultrafiltration.

Large-pore membrane filtration according to the present invention is distinguished from ultrafiltration by several improvements and advantages. First of all, tight and technically very demanding macromolecule separation membranes, for which the molecular weight cut-off is typically 5 kilodalton, are not needed at all. The 50-200 kilodalton large-pore membranes are much easier to operate and maintain. Secondly, the starting material, alkalilignin filter cake, has already undergone a purification: A lot of the soluble small molecular components, especially inorganic salts, have been removed from the cake as a filtrate. Therefore, the re-diluted membrane filtering process in the second stage is fundamentally in a cleaner environment, and thus, membrane polarization and fouling is considerably less prominent. Thirdly, the product, alkalilignin salt concentrate, is the final product. There is no need for acid wash or other secondary cleaning stages, which require the use of extra chemicals distorting the re-cycle and re-use of the removed components in the permeate.

Commercially available conventional membranes types can be used in the large-pore membrane filtration step. The membranes may be constructed from organic materials such as PP, PE, PTFE, polyacrylic, cellulose acetate, polyacrylonitrile, polysulfone, etc. High durability inorganic membrane materials, such as aluminum oxide or zirconium oxide, can also be used, but such materials are not needed.

Advantageously, the large-pore membrane filtration is carried out at a pH in the range of 7 to 11 and at a temperature in the range 20-85° C.

The concentrate may be used as such, or undergo further treatment such as evaporation, freeze-drying or spray drying. A possible further treatment is to further purify the product by diluting the concentrate and repeating the large-pore-membrane-filtration once or several times.

Various embodiments of the present invention have been described above but a person skilled in the art realizes also further minor alterations, which would fall into the scope of the present invention. The breadth and scope of the present invention should not be limited by any of the above-described exemplary embodiments, but should be defined only in accordance with the claims and their equivalents.

Example 1. Production of a Purified Kraft Lignin Salt by Large-Pore Membrane Filtration The pH of softwood kraft black liquor was decreased to 10.0 using $CO_2$ at 60° C. The lignin precipitate suspension was filtered to obtain a kraft lignin filter cake with 57% dry matter content. The lignin filter cake was mixed with deionized water to form a lignin agglomerate colloid at 10% dry solids content. The lignin agglomerate colloid volume was pre-filtered and subjected to large-pore membrane filtration using Alfa Laval-GR51PP 50 kDa cut-off membrane. The large-pore membrane filtration test was carried out at 50° C. to reach volume reduction $Vr=0.7$ ($Vr=Vpermeate/Vinitial$). The resulting oven dry solids concentrations in the concentrate and permeate volumes were 19% and 2.7%, respectively.

81% of the lignin in the feed was recovered in the concentrate volume, while 63% of the main inorganic anions (carbonate, sulphate) and 41% of the sodium were transferred into the permeate. Lignin concentration in the concentrate was 82% of total dry matter content, compared to 67% in the feed. The concentration of the main inorganic anions (carbonate and sulphate) in the permeate was more or less half of that in the feed. The results indicate considerable enrichment of lignin in the concentrate and inorganics in the permeate. More detailed results are shown in Table 1 below.

TABLE 1

The concentration and yield of selected components in the feed, concentrate, and permeate volumes of large-pore membrane filtration test in Example 1.

|  | FEED #1 | CONCENTRATE #1 | | PERMEATE #1 | |
| --- | --- | --- | --- | --- | --- |
|  | Concentration, % of dry matter | Concentration, % of dry matter | Yield, % of feed | Concentration, % of dry matter | Yield, % of feed |
| Lignin | 67 | 82 | 81 | 11 | 3 |
| Sodium (Na+) | 7.6 | 5.4 | 47 | 17 | 41 |
| Carbonate | 4.5 | 2.0 | 30 | 15 | 63 |
| Sulfate | 1.2 | 0.6 | 37 | 4.0 | 63 |

Example 2. Further Purification of the Lignin Salt Via Repeated Large-Pore Membrane Filtration The concentrate volume from Example 1 was mixed with deionized water to achieve 10% dry solids content and subjected to another large-pore membrane filtration test using Alfa Laval-GR51PP 50 kDa cut-off membrane. The test was carried out at 50° C. and continued until volume reduction $Vr=0.7$ was reached ($Vr=Vpermeate/Vinitial$). The resulting oven dry solids concentrations in the concentrate and permeate volumes were 21% and 1.3%, respectively.

95% of the lignin in feed #2 was recovered in the concentrate, while more than half of the carbonate was transferred thru the membrane into the permeate. Lignin concentration in the concentrate was 90% of total dry matter content, compared to 82% in the feed. The results of example 2 indicate that considerable further purification of lignin was achieved by re-diluting the concentrate and repeating the large-pore membrane filtration. More detailed results are shown in Table 2 below.

TABLE 2

The concentration and yield of selected components in the feed, concentrate, and permeate volumes of the second large-pore membrane filtration test in Example 2.

|  | FEED #2 (CONCENTRATE #1) | CONCENTRATE #2 | | PERMEATE #2 | |
| --- | --- | --- | --- | --- | --- |
|  | Concentration, % of dry matter | Concentration, % of dry matter | Yield, % of feed #2 | Concentration, % of dry matter | Yield, % of feed #2 |
| Lignin | 82 | 90 | 95 | 15 | 2 |
| Sodium (Na+) | 5.4 | 4.9 | 78 | 17 | 29 |
| Carbonate | 2.0 | 0.8 | 33 | 13 | 53 |

EXAMPLE 1 and EXAMPLE 2 demonstrate that large-pore membrane filtration efficiently enriches and purifies the lignin agglomerates in the concentrate. High retention of lignin is achieved using 50 kDa membrane. This aspect is exceptional compared to for instance separation and purification of lignin macromolecules by ultrafiltration of black liquor, which, while using a smaller pore 15 kDa membrane, only results in small lignin enrichment in the concentrate (20-30% of the lignin in feed, $Vr=0.9$). [Wallberg et al (2003), Holmqvist et al. (2005)]

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

CITATION LIST

Patent Literature

WO 2006/038863
WO 2013/002687

Non-Patent Literature

1. Luque, Rodriquez, Alvarez, Cova, TAPPI Pulping Conference 1994, p. 507
3. Orlando J. Rojas, John Song, Dimitris S. Argyropoulos Forest Biomaterials Laboratory, College of Natural Resources, North Carolina State University, Raleigh, NC 27695-8005, USA, Juan Bullón Department of Chemical Engineering, Universidad de Los Andes, Merida (Venezuela), "LIGNIN SEPARATION FROM KRAFT BLACK LIQUORS BY TANGENTIAL ULTRAFILTRATION", Science and Technology, La Chimica e l'Industria-Gennaio-Febbraio '06 n. 1-ANNO 88. (Year 2006)
4. Selda Aminzadeh, *Maris* Lauberts, Galina Dobelev, Jevgenija Ponomarenkov, Tuve Mattsson, Mikael E. Lindström, Olena Sevastyanova, MEMBRANE FILTRATION OF KRAFT LIGNIN: STRUCTURAL CHARACTERISTICS AND ANTIOXIDANT ACTIVITY OF THE LOW-MOLECULAR-WEIGHT FRACTION, Industrial Crops & Products 112 (2018) 200-209.
5. Wallberg, O.; Jönsson, A.-S.; Wimmerstedt, R., Ultrafiltration of kraft black liquor with a ceramic membrane., Desalination 2003, 156, 145-153.
6. Holmqvist, A; Wallberg, O.; Jönsson, A.-S., Ultrafiltration of Kraft Black Liquor from Two Swedish Pulp Mills., Chem. Eng. Res. Des. 2005, 83, 994-999.

The invention claimed is:

1. A method for producing purified lignin salt from alkaline spent liquor from chemical cooking of lignocellulosic raw materials, comprising the steps of
   decreasing the spent liquor pH to form a lignin precipitation suspension,
   filtering the lignin precipitation suspension to form a filter cake comprising lignin, and a filtrate,
   mixing the filter cake into a dilution liquid to form an alkalilignin agglomerate colloid,
   subjecting the alkalilignin agglomerate colloid to large-pore membrane filtration, and
   recovering a purified lignin salt concentrate,
      wherein the nominal cut-off value of the large-pore membrane filtration is at least 40 kDa.

2. The method according to claim 1, wherein the spent liquor pH is lowered below 11.

3. The method according to claim 2, wherein the spent liquor pH is lowered to 9-10.5.

4. The method according to claim 1, wherein the pH is lowered by addition of $H_2SO_4$, $SO_2$, HCl or $CO_2$.

5. The method according to claim 4, wherein the pH is lowered by addition of $CO_2$.

6. The method according to claim 1, wherein the dilution liquid is water.

7. The method according to claim 1, wherein the formed alkalilignin agglomerate colloid is subjected to large-pore-membrane filtration with the nominal cut-off value in the range of 40-400 kDa.

8. The method according to claim 7, wherein the cut-off value is in the range 50-200 kDa.

9. The method according to claim 1, wherein the pH decrease is carried out at a temperature in the range 40-85° C.

10. The method according to claim 1, wherein the large-pore-membrane filtration is performed at a temperature in the range 20-85° C.

11. The method according to claim 1, wherein the large-pore-membrane filtration is performed at a pH in the range 7-11.

12. The method according to claim 1, additionally comprising at least one step of rediluting the purified lignin salt and subjecting it to large-pore-membrane filtration.

13. The method according to claim 1, further comprising treatment of the concentrate by evaporation, freeze-drying or spray drying.

14. The method according to claim 1, wherein the alkalilignin agglomerate colloid has a dry solids content of 10 wt. %.

* * * * *